United States Patent
Ahn et al.

(10) Patent No.: US 10,506,490 B2
(45) Date of Patent: Dec. 10, 2019

(54) METHOD FOR CELL SWITCHING IN UNLICENSED BAND AND APPARATUS USING SAME

(71) Applicant: LG ELECTRONICS INC., Seoul (KR)

(72) Inventors: Joonkui Ahn, Seoul (KR); Yoonoh Yang, Seoul (KR); Hakseong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/537,367

(22) PCT Filed: Dec. 15, 2015

(86) PCT No.: PCT/KR2015/013765
§ 371 (c)(1),
(2) Date: Jun. 16, 2017

(87) PCT Pub. No.: WO2016/099137
PCT Pub. Date: Jun. 23, 2016

(65) Prior Publication Data
US 2017/0367025 A1 Dec. 21, 2017

Related U.S. Application Data

(60) Provisional application No. 62/092,269, filed on Dec. 16, 2014.

(51) Int. Cl.
*H04W 36/36* (2009.01)
*H04W 74/08* (2009.01)
*H04W 36/00* (2009.01)

(52) U.S. Cl.
CPC ....... *H04W 36/36* (2013.01); *H04W 36/0061* (2013.01); *H04W 74/08* (2013.01); *H04W 36/0069* (2018.08)

(58) Field of Classification Search
CPC .............................. H04W 36/36; H04W 74/08
(Continued)

(56) References Cited

U.S. PATENT DOCUMENTS

2006/0240829 A1* 10/2006 Hurst ................ H04W 36/0083
455/436
2008/0002633 A1* 1/2008 Pandey ................. H04W 48/12
370/338

(Continued)

FOREIGN PATENT DOCUMENTS

KR    10-2013-0006378 A    1/2013
WO    2012/121757 A1    9/2012
WO    2014/017869 A1    1/2014

OTHER PUBLICATIONS

Ahmed Elsherif, et al., "Adaptive Small Cell Access of Licensed and Unlicensed Bands," IEEE ICC Wireless Networking Symposium, Jun. 2013, pp. 6327-6332, 6 pages.

(Continued)

*Primary Examiner* — Angel T Brockman
(74) *Attorney, Agent, or Firm* — Lee Hong Degerman Kang & Waimey (57) ABSTRACT

A method for cell switching in an unlicensed band and an apparatus using same are provided. The apparatus receives cell configuration information related to a plurality of candidate cells operating in an unlicensed band, and receives a beacon signal designating at least one of the plurality of candidate cells as a target operating cell in which the apparatus is to operate. The apparatus is switched to the target operating cell.

11 Claims, 6 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2012/0040696 A1* | 2/2012 | Siomina | G01S 5/0036 |
| | | | 455/456.6 |
| 2013/0265906 A1* | 10/2013 | Abraham | H04W 40/246 |
| | | | 370/254 |
| 2014/0080483 A1 | 3/2014 | Elsherif et al. | |
| 2014/0204847 A1* | 7/2014 | Belleschi | H04W 76/023 |
| | | | 370/329 |
| 2015/0004971 A1* | 1/2015 | Yilmaz | H04W 28/06 |
| | | | 455/434 |
| 2015/0063228 A1* | 3/2015 | Aldana | G01S 5/0081 |
| | | | 370/329 |

OTHER PUBLICATIONS

PCT International Application No. PCT/KR2015/013765, International Search Report dated Mar. 17, 2016, 4 pages.

* cited by examiner

METHOD FOR CELL SWITCHING IN UNLICENSED BAND AND APPARATUS USING SAME

CROSS-REFERENCE TO RELATED APPLICATIONS

This application is the National Stage filing under 35 U.S.C. 371 of International Application No. PCT/KR2015/013765, filed on Dec. 15, 2015, which claims the benefit of U.S. Provisional Application No. 62/092,269 filed on Dec. 16, 2014, the contents of which are all hereby incorporated by reference herein in their entirety.

BACKGROUND OF THE INVENTION

Field of the Invention

The present invention relates to wireless communication, and more particularly, to a cell switching method in an unlicensed band in a wireless communication system, and an apparatus using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for cell switching in an unlicensed band and a device using the same.

In an aspect, a method for cell switching in an unlicensed band includes receiving, by a wireless device, cell configuration information regarding a plurality of candidate cells operating in the unlicensed band, receiving, by the wireless device, a beacon signal for designating a target operating cell in which the wireless device will operate from at least one cell of the plurality of candidate cells, and switching, by the wireless device, to the target operating cell.

N beacon signals may be received in N candidate cells. M beacon signals out of the N beacon signals may designate one cell of the plurality of candidate cells as the target operating cell. M is a natural number satisfying N>=M.

In another aspect, a device in a wireless communication system includes a transceiver configured to transmit and receive a radio signal and a processor operatively coupled to the transceiver. The processor is configured to control the transceiver to receive cell configuration information regarding a plurality of candidate cells operating in the unlicensed band, control the transceiver to receive a beacon signal for designating a target operating cell in which the wireless device will operate from at least one cell of the plurality of candidate cells, and control the transceiver to switch to the target operating cell.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
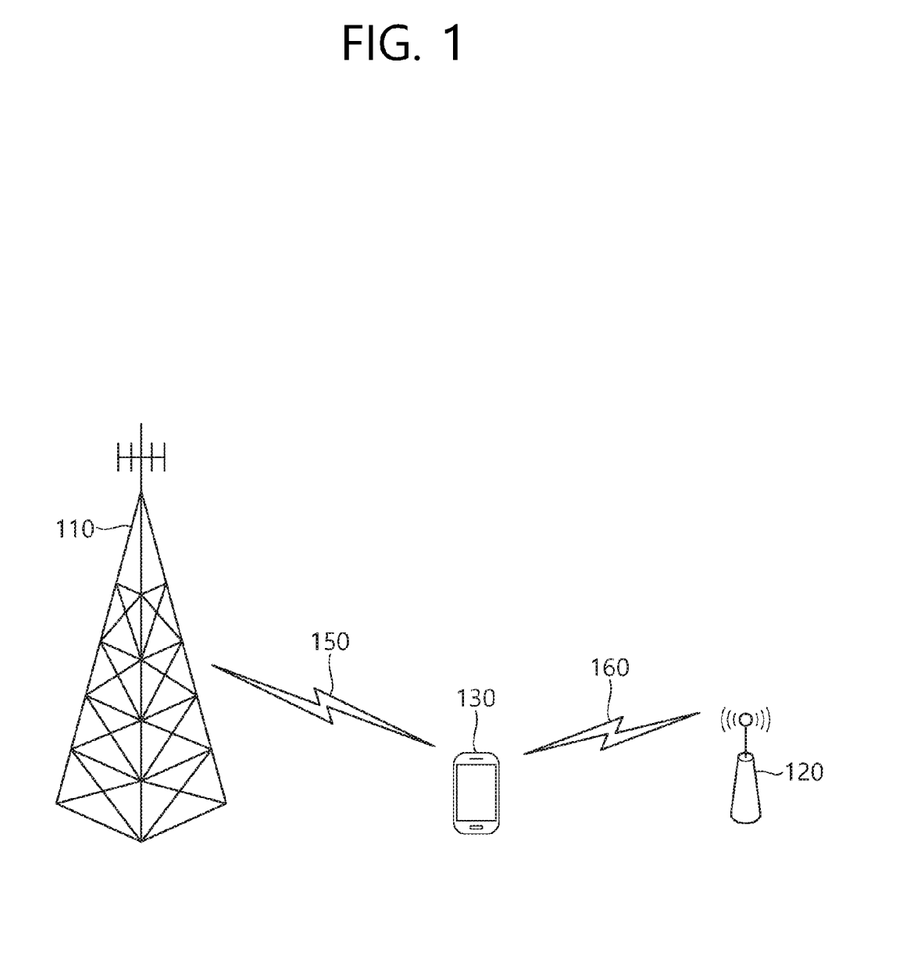
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell or an unlicensed carrier. A cell operating in a licensed band is called a licensed cell or a licensed carrier.

When an LTE system operates in the unlicensed band, it may be difficult for a BS and a UE to operate only in one fixed unlicensed cell for a long time. For example, assume that the UE is communicating with the BS in a specific unlicensed cell. If traffic of another communication system such as a WLAN or the like increases in the specific unlicensed cell or a node of another communication system additionally starts communication, it may be difficult to continue communication between the BS and the UE. According to a characteristic in which the unlicensed band is not occupied exclusively by a specific communication system, this situation may occur at an unpredictable time.

Therefore, hereinafter, it is proposed a method in which the BS and the UE continue communication by switching a plurality of cells in the unlicensed band according to a channel environment. For cell switching, it is necessary to minimize a disconnected access between the BS and the UE.

Figure 2:
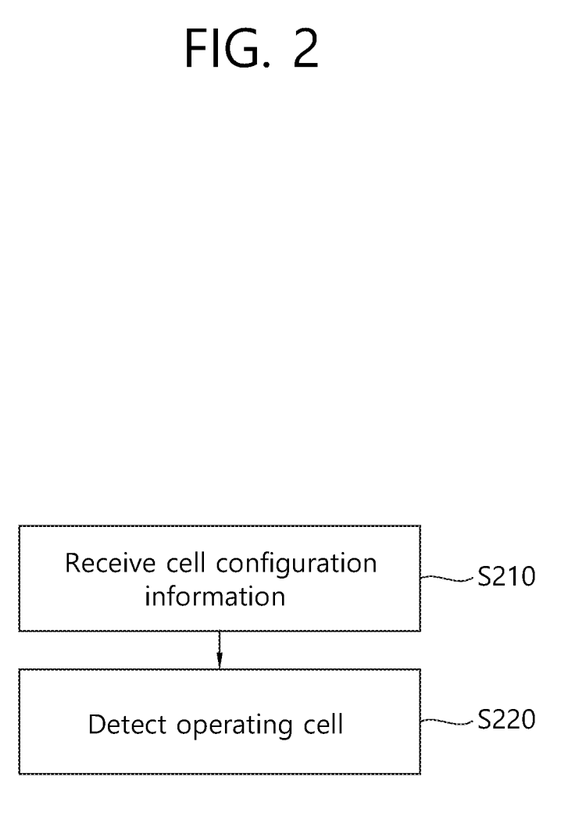
FIG. 2 is a flowchart showing a cell switching method according to an embodiment of the present invention.

FIG. 2 is a flowchart showing a cell switching method according to an embodiment of the present invention.

In step S210, a UE receives cell configuration information. The UE may receive the cell configuration information in a licensed cell. The cell configuration information may include information regarding a plurality of candidate cells in an unlicensed band. The candidate cell is an unlicensed cell in which the UE can perform switching.

The cell configuration information may include at least any one of the followings.

(1) A center frequency and bandwidth of a candidate cell (2) Information required for detection of a beacon signal transmitted by the candidate cell: a transmission period of the beacon signal, a sequence of the beacon signal (3) Information for transmitting a random access preamble to the candidate cell: an index of the random access preamble, a time/frequency resource for transmitting the random access preamble (4) Information required for reception of a DL channel (e.g., a physical downlink control channel (PDCCH), a physical downlink shared channel (PDSCH)) in the candidate cell: antenna configuration, cell specific reference signal (CRS) configuration, channel state information-reference signal (CSI-RS) configuration information, information regarding a region in which the PDCCH is transmitted.

(5) Information required for transmission of a UL channel (e.g., a physical uplink control channel (PUCCH), a physical uplink shared channel (PUSCH)) in the candidate cell: whether the PUCCH can be transmitted, PUCCH resource configuration, PUSCH resource configuration In step S220, the UE detects one or more operating cells in which the UE will operate among the plurality of candidate cells. The operating cell is a cell in which the UE can actually perform data transmission/reception with respect to a BS.

If there is no unlicensed cell currently operating in the UE, a cell detected from the plurality of candidate cells is the operating cell. In the presence of the unlicensed cell currently operating in the UE, the UE may perform switching to the detected cell.

The UE performs communication in a cell designated as the operating cell among the plurality of candidate cells. At least any one of the plurality of candidate cells transmits a beacon signal indicating the operating cell. The UE detects the beacon signal, and if it is recognized that the operating cell is changed, may continue communication by switching to a new operating cell. For a fast access to the new operating cell, a random access may be attempted on the basis of configuration information of a candidate cell designated as the operating cell, and a DL channel may be received.

Figure 3:
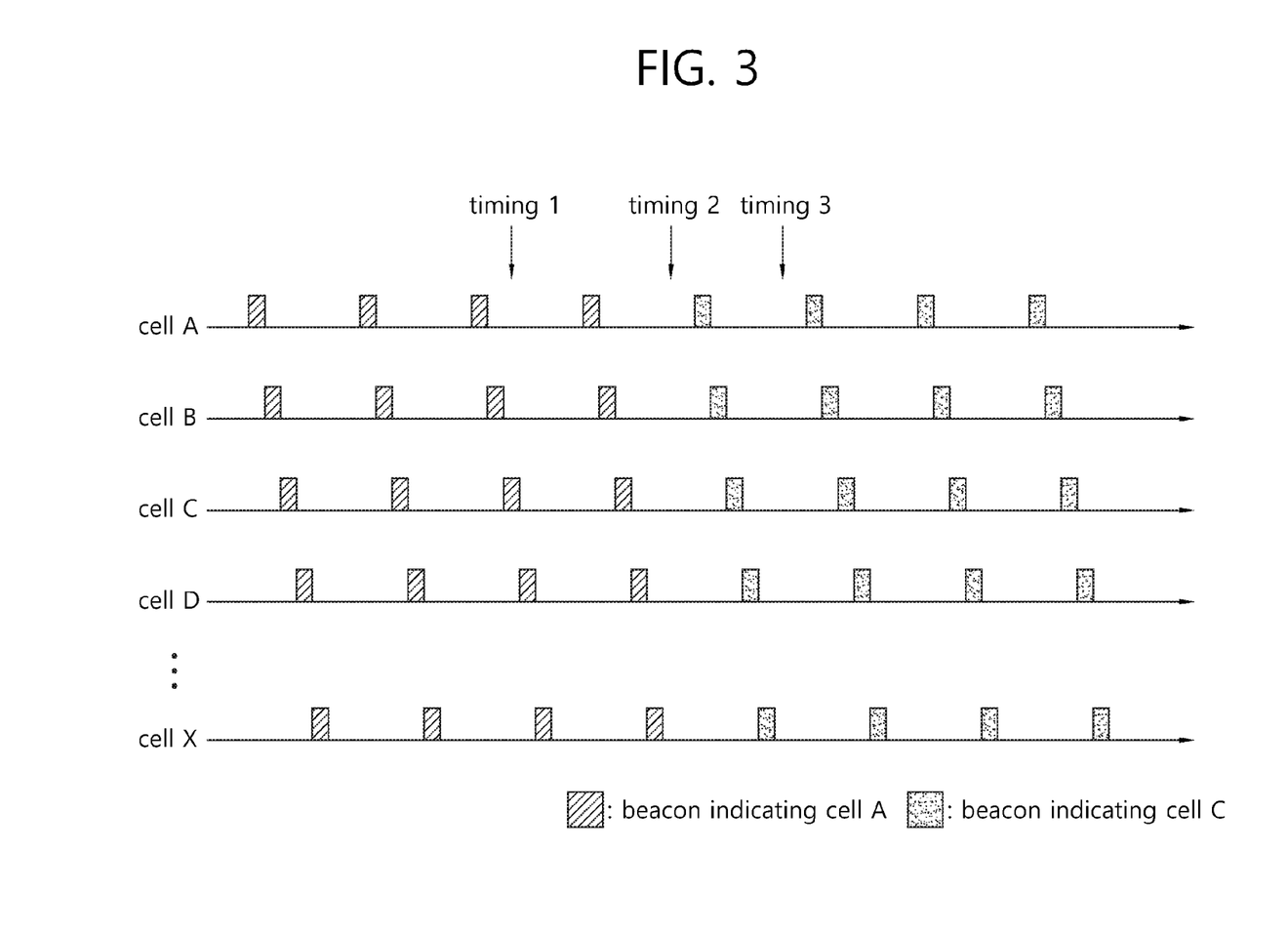
FIG. 3 shows a method of detecting an operating cell according to an embodiment of the present invention.

FIG. 3 shows a method of detecting an operating cell according to an embodiment of the present invention.

Assume that a candidate cell includes a cell A, a cell B, . . . , a cell X. Each candidate cell transmits a beacon signal for each beacon period. The beacon period may be configured independently or identically for each candidate cell.

All beacon signals may include information indicating the current operating cell. In one embodiment, the beacon signal may be defined as a combination of a primary synchronization signal (PSS)/secondary synchronization signal (SSS)/CRS/CSI-RS used in 3GPP LTE. An operating cell may be indicated among a plurality of candidate cells by the combination of corresponding signals. In another embodiment, the beacon signal may be generated from a basic sequence. The basic sequence may be cyclically shifted by a cyclic shift value to generate the beacon signal. The cyclic shift value may be determined from a cell index of a candidate cell for transmitting the beacon signal and/or a cell index of the operating cell.

All candidate cells may transmit the beacon signal. Alternatively, some of the plurality of candidate cells may transmit the beacon signal.

Assume that an initial operating cell is the cell A. All beacon signals transmitted in the cell A, the cell B, . . . , and the cell X may indicate the cell A as an operating cell (this is called a current operating cell). A channel situation of the cell A deteriorates starting from a timing 1, and thus the operating cell is changed to the cell C starting from a timing 2. Therefore, all beacon signals after the timing 2 indicate the cell C (this is called a target operating cell). A UE which has received the beacon signal at a timing 3 may switch the operating cell to the cell C.

After the timing 1, the channel situation of the cell A which is the current operating cell may deteriorate and thus the UE may not be able to receive the beacon signal from the cell A. However, after the timing 2, the UE may receive a beacon signal indicating the cell C from another cell, and may perform switching to the cell C.

If the target operating cell indicated by the beacon signal is different from the current operating cell, the UE continues communication by switching to the operating cell indicated by the beacon signal. If an error occurs in detection of the beacon signal, the UE may perform switching to a wrong operating cell. Therefore, a criterion for switching to the operating cell may be defined as follows.

In one exemplary embodiment, if M (N>=M) beacon signals out of the N beacon signals received from N candidate cells indicate a cell different from the current operating cell as the target operating cell, the UE may perform switching to the target operating cell.

In another embodiment, if at least L continuous beacon signals indicate the same target operating cell, the UE may perform switching to the target operating cell.

Figure 4:
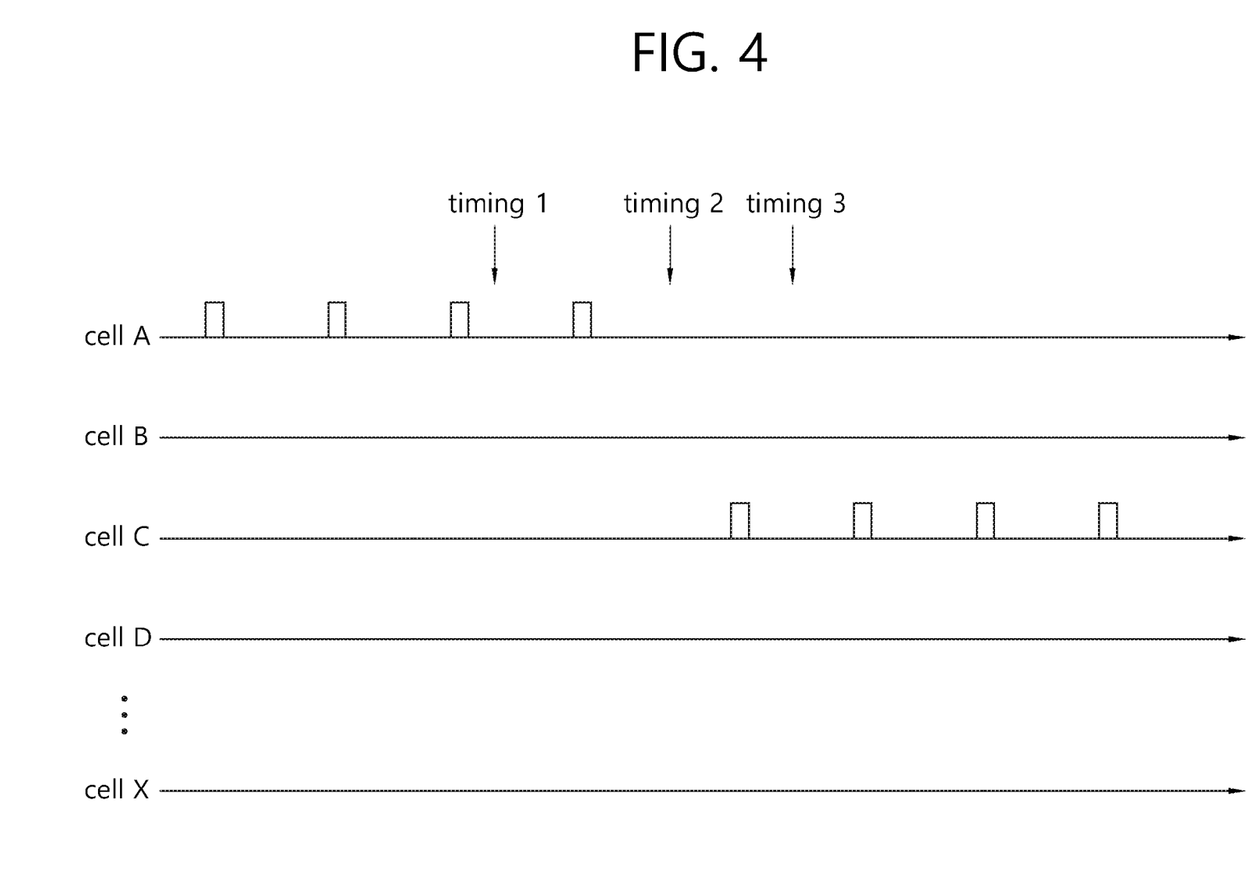
FIG. 4 shows a method of detecting an operating cell according to another embodiment of the present invention.

FIG. 4 shows a method of detecting an operating cell according to another embodiment of the present invention.

A beacon signal is transmitted only in an operating cell among a plurality of candidate cells. The beacon signal may include information indicating a current operating cell, or the beacon signal may always be identical irrespective of the operating cell.

At a timing 1, a cell A is the operating cell, and only the cell A transmits the beacon signal. After a timing 2, the operating cell is changed to a cell C, the cell A stops transmission of the beacon signal, and the cell C starts transmission of the beacon signal.

If the beacon signal is no longer detected or reception quality deteriorates in the current operating cell, the UE may confirm another operating cell for transmitting the beacon signal, and may switch to a corresponding operating cell.

A new operating cell may transmit the same beacon signal as the previous operating cell by considering a case where a plurality of operating cells are managed. If the beacon signal is not detected from the current operating cell, the UE may perform switching by recognizing a cell for transmitting the same beacon signal as the new operating cell.

Figure 5:
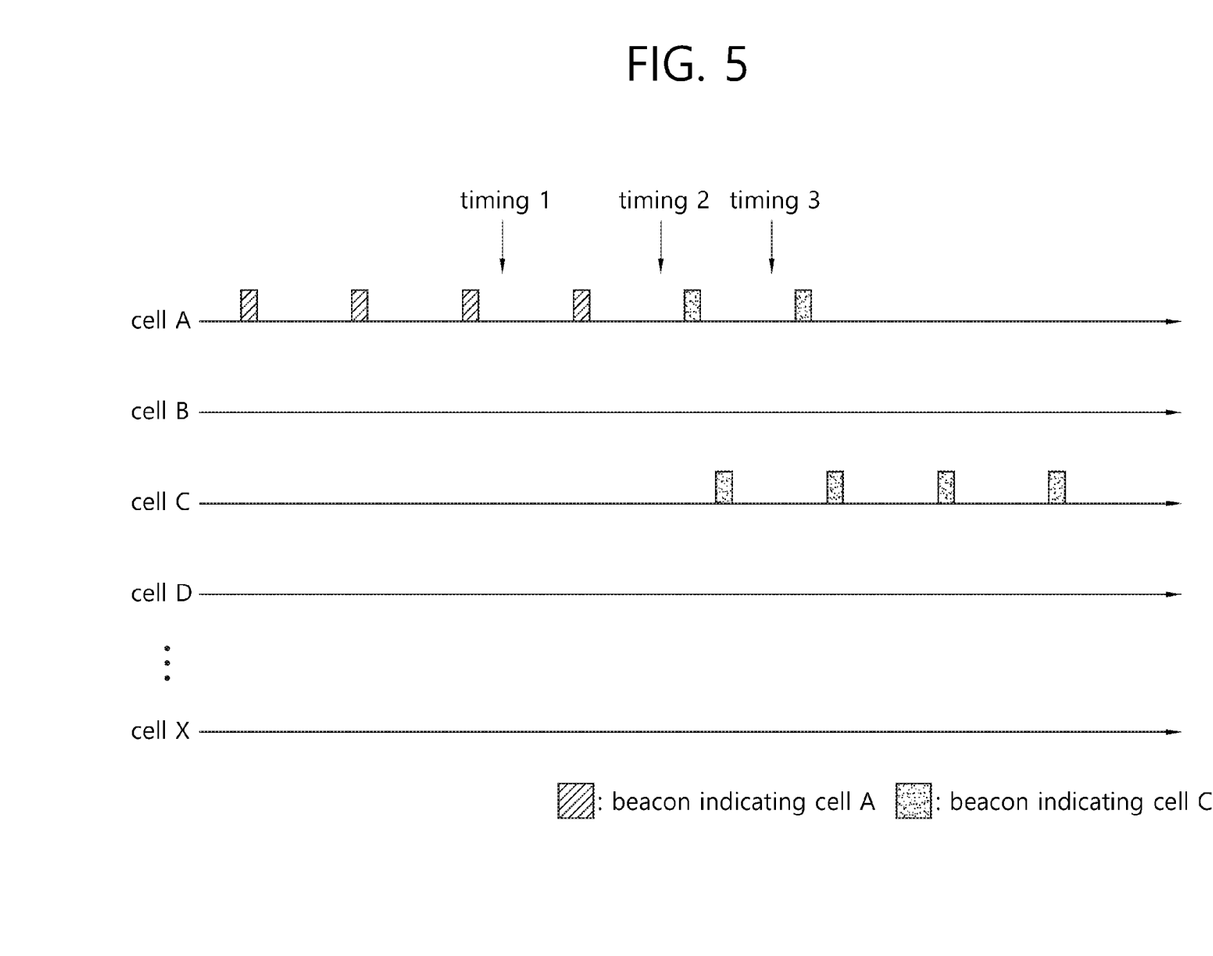
FIG. 5 shows a method of detecting an operating cell according to another embodiment of the present invention.

FIG. 5 shows a method of detecting an operating cell according to another embodiment of the present invention.

A beacon signal is transmitted in the operating cell among a plurality of candidate cells. In a duration in which the operating cell is changed (this is called a switching duration), the beacon signal is transmitted in both of a previous operating cell and a new operating cell. The beacon signal includes information indicating a corresponding operating cell.

At a timing 1, the operating cell is a cell A. The beacon signal is transmitted only in the cell A. After a timing 2, the operating is changed to a cell C. Even if the operating cell is changed, the cell A transmits a beacon signal indicating the cell C during a specific duration. After the timing 2, the cell C also transmits the beacon signal indicating the cell C.

Since the beacon signal is transmitted in the previous operating cell even after the operating cell is changed, the UE operating in the cell A may detect a beacon signal indicating the changed operating cell also in the cell A. Therefore, cell switching can be performed much faster.

The new operating cell may transmit the same beacon signal as the previous operating cell by considering a case where a plurality of operating cells are managed. If the beacon signal is not detected from the current operating cell, the UE may perform switching by recognizing a cell for transmitting the same beacon signal as the new operating cell. Alternatively, the previous operating cell may transmit a beacon signal indicating the new operating cell during a switching duration, so that the UE can detect the new operating cell much faster.

The embodiments shown in FIG. 3 to FIG. 5 may be applied when the UE attempts an initial access to one of the plurality of candidate cells. The UE may detect the operating cell according to the aforementioned method, and may attempt the initial access to the operating cell.

Figure 6:
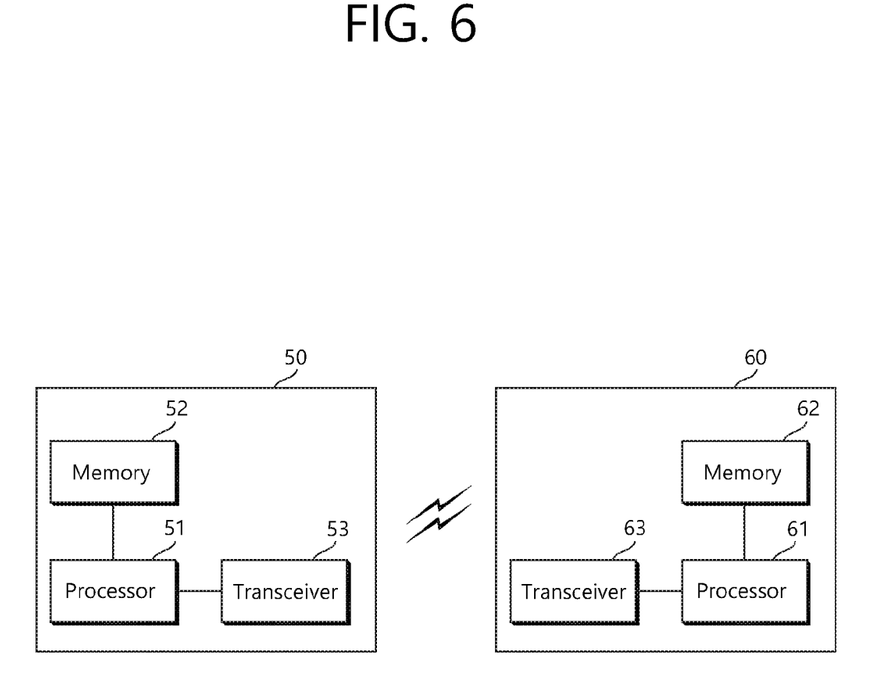
FIG. 6 is a block diagram showing a wireless communication system according to an embodiment of the present invention.

FIG. 6 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for switching, by a wireless device, a target operating cell in an unlicensed band, the method comprising:
   receiving cell configuration information regarding a plurality of candidate cells operating in the unlicensed band, wherein the plurality of candidate cells include a first cell and a second cell;
   receiving a first beacon signal from the first cell before a switching duration, wherein the first beacon signal is used for designating that the target operating cell is the first cell before the switching duration;
   receiving the first beacon signal from the first cell and a second beacon signal from the second cell during the switching duration, wherein the first beacon signal is used for designating that the target operating cell is changed to the second cell during the switching duration, wherein the second beacon signal is used for designating that the target operating cell is the second cell; and
   switching the target operating cell to the second cell based on the first beacon signal and the second beacon signal during the switching duration,
   wherein the first beacon signal and the second beacon signal are generated from a basic sequence,
   wherein the basic sequence is cyclically shifted by a cyclic shift value to generate the first beacon signal and the second beacon signal, and
   wherein the cyclic shift value is generated by using a cell index of the target operating cell and by using a cell index of a cell for transmitting the first beacon signal and the second beacon signal.

2. The method of claim 1, wherein N beacon signals are received in N candidate cells.

3. The method of claim 2, wherein M beacon signals out of the N beacon signals designate one cell of the plurality of candidate cells as the target operating cell, where M is a natural number satisfying N>=M.

4. The method of claim 3, wherein the M beacon signals are identical signals.

5. The method of claim 1, wherein the cell configuration information comprises information regarding a transmission period of a beacon signal transmitted in each of the plurality of candidate cells.

6. The method of claim 1, wherein the cell configuration information is received in a licensed cell.

7. The method of claim 1, wherein the cell configuration information comprises information for performing a random access procedure in each of the plurality of candidate cells.

8. A device in a wireless communication system, the device comprising:
   a transceiver configured to transmit and receive a radio signal; and
   a processor operatively coupled to the transceiver and configured to:
   control the transceiver to receive cell configuration information regarding a plurality of candidate cells operating in the unlicensed band, wherein the plurality of candidate cells include a first cell and a second cell;
   control the transceiver to receive a first beacon signal from the first cell before a switching duration, wherein the first beacon signal is used for designating that the target operating cell is the first cell before the switching duration;
   control the transceiver to receive the first beacon signal from the first cell and a second beacon signal from the second cell during the switching duration, wherein the first beacon signal is used for designating that the target operating cell is changed to the second cell during the switching duration, wherein the second beacon signal is used for designating that the target operating cell is the second cell; and control the transceiver to switch the target operating cell to the second cell based on the first beacon signal and the second beacon signal during the switching duration, wherein the first beacon signal and the second beacon signal are generated from a basic sequence, wherein the basic sequence is cyclically shifted by a cyclic shift value to generate the first beacon signal and the second beacon signal, and wherein the cyclic shift value is generated by using a cell index of the target operating cell and by using a cell index of a cell for transmitting the first beacon signal and the second beacon signal.

9. The device of claim 8, wherein N beacon signals are received in N candidate cells.

10. The device of claim 9, wherein M beacon signals out of the N beacon signals designate one cell of the plurality of candidate cells as the target operating cell, where M is a natural number satisfying N>=M.

11. The device of claim 10, wherein the M beacon signals are identical signals.

* * * * *